United States Patent [19]
Ku et al.

[11] Patent Number: 6,000,557
[45] Date of Patent: Dec. 14, 1999

[54] SELF-CLEANING LIQUID FILTER AND METHOD FOR FILTERING A LIQUID

[75] Inventors: Yi Lang Ku, Miao-Li Hsien; Ming Shi Ni; Wei Cheng Lee, both of Taipei; Shao Wei Ku, Hsinchu, all of Taiwan

[73] Assignee: Taiwan Semiconductor Manufacturing Company, Ltd., Hsin-Chu, Taiwan

[21] Appl. No.: 09/203,763

[22] Filed: Dec. 2, 1998

[51] Int. Cl.⁶ ..................................... B01D 33/06
[52] U.S. Cl. ........................ 210/391; 210/402; 210/407; 210/411; 96/233
[58] Field of Search .................... 210/391, 402, 210/407, 409, 411; 96/233

[56] References Cited

U.S. PATENT DOCUMENTS 2,351,712  6/1944  Sattele et al. ......................... 210/402

*Primary Examiner*—Robert J. Popovics
*Attorney, Agent, or Firm*—Tung & Associates

[57] ABSTRACT

A self-cleaning liquid filter and a method for filtering a liquid are disclosed. In the self-cleaning liquid filter, a rotating hollow drum covered with a filter element is mounted in a filter housing and turned by a waste liquid that contains debris or dirt. Filtered or cleaned liquid enters into the hollow drum and is pumped away at one end of the drum while debris or dirt in the waste liquid are trapped on the filter. A spray nozzle is mounted inside the rotating drum and clean water is sprayed out to wash away the debris and dirt carried by the filter element into a debris collector equipped with a second filter. The debris and dirt are trapped by the second filter while a filtered, or clean liquid is drained back into the filter housing. The novel device is self powered by the waste liquid flow and thus no external power is necessary for operating the device.

10 Claims, 2 Drawing Sheets

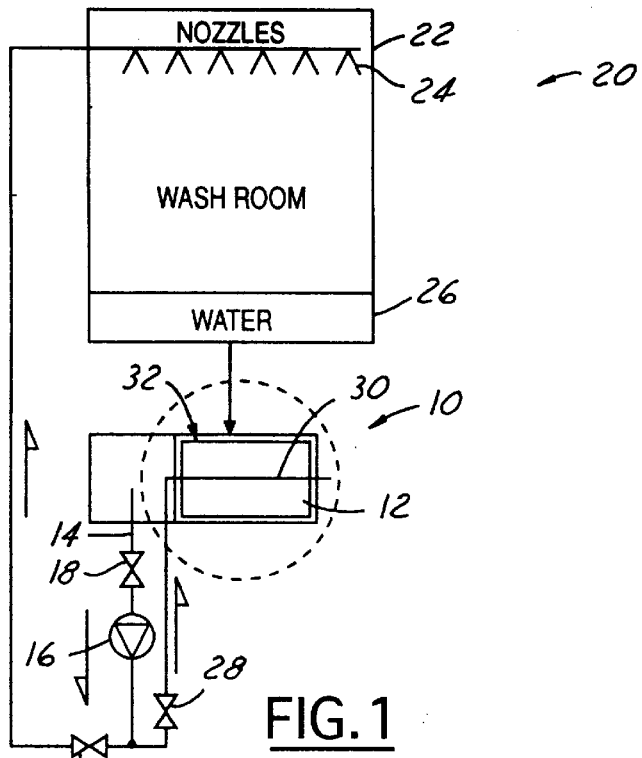
FIG.1
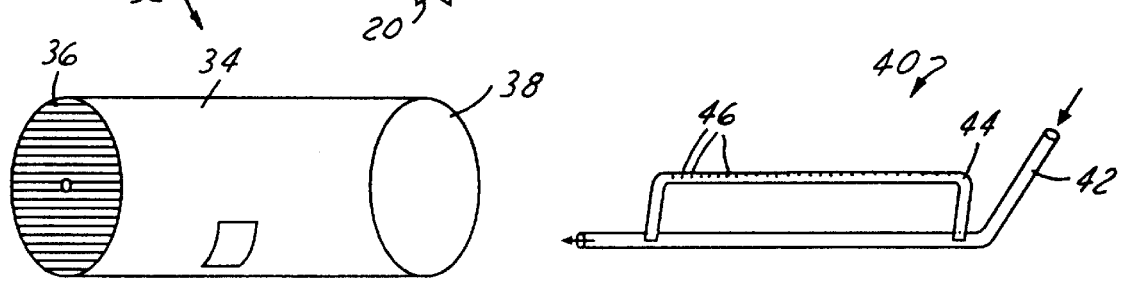
FIG.2A
FIG.2B
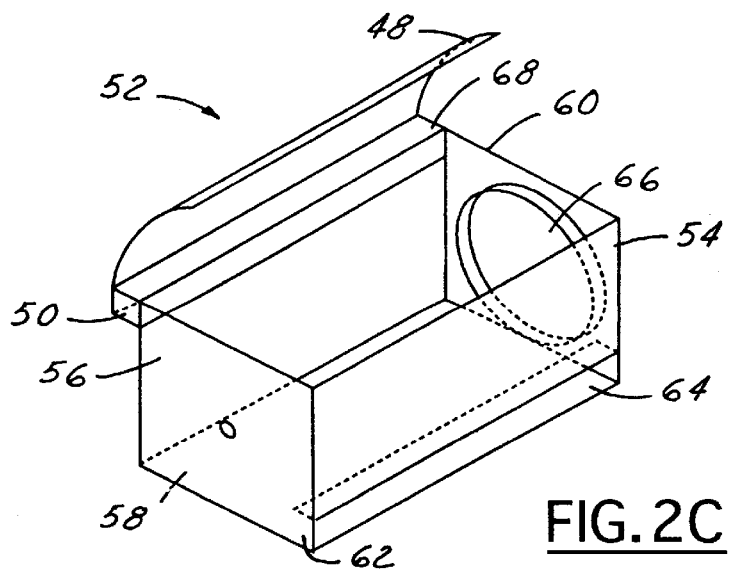
FIG.2C

SELF-CLEANING LIQUID FILTER AND METHOD FOR FILTERING A LIQUID

FIELD OF THE INVENTION

The present invention generally relates to a liquid filter and a method for filtering a liquid and more particularly, relates to a self-cleaning and self-powered liquid filter that automatically removes debris from a filter element and a method for filtering a liquid by the selfcleaning liquid filter.

BACKGROUND OF THE INVENTION

In a factory, outside air is frequently required for the operation of various plant facilities. For instance, to operate a factory air conditioning unit, outside air must be drawn through an air intake grill into an air conditioner intake opening. This is accomplished by first removing a majority of airborne particles or debris by a filter means or by a wet scrubber. When a filter means is used to filter out the airborne particles and debris, the filter means must be constantly cleaned in regular intervals so that air flow through the filter is not hindered. When a wet scrubber is used to clean the intake air, a city water supply is normally used to wash the air out before it enters into the air conditioning intake opening. Waste water from the scrubber is then routed to a filtering station and reused. The filtering of the waste water is a tedious process since the filter must be constantly cleaned by manual labor to ensure the effective operation of the scrubber. In order to maintain the efficiency of the wet scrubber, the process of filtering out of airborne particles and debris from the waste water is an important step of the total process. The airborne particles may contain naturally occurring substances such as bird feathers, leaves, dirt or any other environmental contaminants. The conventional method for removing such airborne particles is by mechanical filtering and the continuous task of cleaning the filters.

It is therefore an object of the present invention to provide a liquid filter that can be continuously operated without the drawbacks or shortcomings of the conventional liquid filters.

It is another object of the present invention to provide a liquid filter that can be operated by its own hydraulic power without outside power requirement.

It is a further object of the present invention to provide a liquid filter that serves a self-cleaning function for removing airborne particles or debris that it filtered out from outside air.

It is another further object of the present invention to provide a self-cleaning liquid filter by utilizing a rotating hollow drum filter which is operated by the liquid flow to be filtered.

It is still another object of the present invention to provide a self-cleaning liquid filter by using a first filter element for cleaning waste water and a second filter element for cleaning the first filter element.

It is yet another object of the present invention to provide a self-cleaning liquid filter that is constructed by a filter housing, a liquid reflector for collecting sprayed liquid, an elongated hollow drum covered by a first filter element and a liquid spray nozzle for removing debris collected by the first filter element.

It is still another further object of the present invention to provide a method for filtering a liquid by utilizing a self-cleaning and self-powered liquid filter which substantially cleans itself such that manual cleaning is not required.

SUMMARY OF THE INVENTION

In accordance with the present invention, a self-cleaning and self-powered liquid filter and a method for filtering a liquid in an automated manner are disclosed.

In a preferred embodiment, a self-cleaning liquid filter is provided which includes a filter housing of elongated shape that has a front panel, a back panel and a bottom panel sealingly joined together by a first and second side panel, a liquid inlet through a slot opening at a lower portion of the front panel and a filtered liquid outlet through the first side panel, an axis connecting the first and the second side panels, a liquid reflector extending upwardly from a top edge of the back panel and curved inwardly toward the filter housing adapted for reflecting a liquid spray and for collecting debris in a debris collector while returning the liquid through a second filter member into the filter housing, an elongated hollow drum member that is mounted and is free to rotate on the axis, the drum member is covered with a first filter element on its circumferential surface, sealed at a second end and opened at a first end in fluid communication with the filtered liquid outlet in the first side panel of the filter housing, the elongated drum member is mounted in close proximity to the bottom panel such that when a liquid flow enters the liquid inlet through the slot opening in the filter housing, it enters the elongated drum member and rotates the drum member in a direction away from the slot opening with any debris in the liquid flow collected by the first filter element, and a liquid spray nozzle mounted on the axis inside the elongated hollow drum member adapted for spraying a clean liquid flow toward the liquid reflector through the first filter element for removing any debris collected by the first filter element.

The self-cleaning liquid filter is self-powered such that it does not require any external power. The liquid flow through the filter may be water with airborne particles and debris. The liquid spray nozzle may include a liquid flow tube and a plurality of spray holes. The first filter member covering the circumferential surface of the drum member is formed in a metal mesh. The first filter member that covers the circumferential surface of the drum member is formed of a material of metal, plastic or paper. The second filter member may be positioned vertically. The clean liquid flow from the spray nozzle may have a liquid pressure of at least 0.5 kg/cm$^2$. The self-cleaning liquid filter may be a water filter for an air conditioner intake air cleaning system.

The present invention is further directed to a method for filtering a liquid that can be carried out by the operating steps of first providing a self-cleaning liquid filter that includes a filter housing of elongated shape that has a front panel, a back panel and a bottom panel sealingly engaged together by a first and a second side panel, a liquid inlet through a slot opening at a lower portion of the front panel and a filtered liquid outlet through a first side panel, an axis connecting the first and second side panels, a liquid reflector extending upwardly from a top edge of the back panel and curved inwardly toward the filter housing adapted for reflecting a liquid spray and for collecting debris in a debris collector while returning the liquid through a second filter member into the filter housing, an elongated hollow drum member mounted on the axis, the drum member is covered with a first filter element on its circumferential surface, sealed at a second end and opened at a first end in fluid communication with the filtered liquid outlet in the first side panel of the filter housing, the elongated drum member is mounted in close proximity to the bottom panel, and a liquid spray nozzle mounted on the axis inside the elongated hollow drum member, and flowing a liquid flow into the liquid inlet through the slot opening in the filter housing to enter into and to rotate the drum member in a direction away from the slot opening, and collecting debris in the liquid flow by the first filter element on the circumferential surface, and spraying a clean liquid flow towards the liquid reflector through the first filter element and removing debris collected by the first filter element into the debris collector.

The method for filtering a liquid by a self-cleaning liquid filter may further include the step of rotating the elongated hollow drum member by the liquid flow without using external power. The method may further include the step of flowing a water flow that contains debris into the liquid inlet in the filter housing, the step of providing a liquid spray nozzle in a liquid flow tube equipped with a plurality of apertures. The method may further include the step of covering the hollow drum member with a first filter element that is made of metal mesh, paper or plastic. The method may further include the step of mounting the second filter element in a vertical position, or in a horizontal position. The method may further include the step of spraying the clean liquid flow at a pressure of at least 0.5 kg/cm$^2$, or preferably at a pressure of at least 1.0 kg/cm$^2$.

BRIEF DESCRIPTION OF THE DRAWINGS

These and other objects, features and advantages of the present invention will become apparent from the following detailed description and the appended drawings in which:

FIG. 1 is a graph illustrating the present invention self-cleaning filter as part of an intake air scrubbing system.

FIG. 2A is a perspective view of the present invention elongated hollow drum member.

FIG. 2B is a perspective view of the present invention liquid spray nozzle.

FIG. 2C is a perspective view of the present invention filter housing of elongated shape.

DETAILED DESCRIPTION OF THE PREFERRED EMBODIMENT

Figure 3:
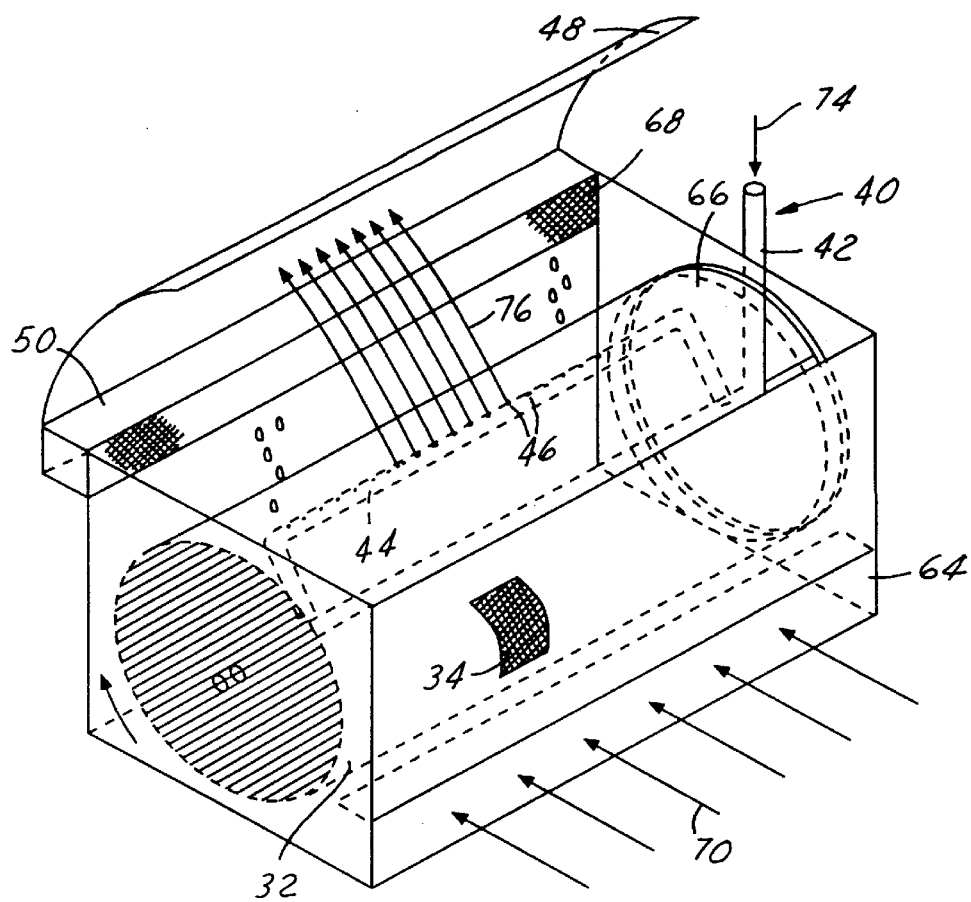
FIG. 3 is a perspective view of the present invention self-cleaning and self-powered liquid filter.

The present invention discloses a self-cleaning and self-powered liquid filter and a method for filtering a liquid by the filter.

In the self-cleaning liquid filter, a rotating drum member covered with a filter element is used to filter out airborne type of debris in waste water from an intake air scrubber, a spray nozzle situated inside the drum member then injects a clean liquid outwardly through the filter element to remove the trapped debris into a debris collector. The debris may then be manually removed. The liquid spray nozzle can be operated at a liquid pressure of at least 0.5 kg/cm$^2$, and preferably at a pressure of at least 1 kg/cm$^2$. The liquid spray nozzle can be operated at any angle as long as the debris separated from the filter element can be collected together with the sprayed liquid by a debris collector and then liquid can be filtered out by a secondary filter and returned to the filter housing.

Referring initially to FIG. 1, a graph illustrating the present invention self-cleaning filter 10 in an intake air scrubbing system 20. Intake air for an air conditioning system enters the scrubber chamber 22 and is scrubbed by clean city water (not shown) sprayed through the spray nozzles 24. After scrubbing, the waste water 26 is flown into the self-cleaning filter 10 to remove the airborne debris and particles by a first filter element 12. A cleaned, filtered liquid flow 14 is then pumped by a pump 16 controlled by valves 18, 20 back into the scrubber chamber 22. Simultaneously, the filtered liquid also passes through valve 28 and flown back into the self-cleaning filter 10 through the spray nozzle 30. A detailed view of the self-cleaning filter 10 and functions of each component are explained in FIGS. 2A~2C, 3 and 4.

Referring now to FIG. 2A wherein a perspective view of the present invention elongated hollow drum member 32 is shown. The drum member 32 is formed by a circumferential surface 34 joined at one end by an end piece 36 while the opposite end 38 remains open. The first filter element 34 that covers the circumferential area of the hollow drum 32 can be made by a variety of materials such as metal mesh, plastic or paper. When a stainless steel metal mesh is used, the mesh size should always be smaller than the aperture size for the spray nozzle so that nozzle blockage can be prevented.

Another major component for the present invention self-cleaning liquid filter is a liquid spray nozzle 40 shown in FIG. 2B. The spray nozzle 40 is constructed of liquid flow tubes 42, 44 which are in fluid communication with each other. Liquid flow tube 44 is equipped with a plurality of apertures 46, or spray holes, for spraying a liquid flow therethrough. The liquid spray nozzle 40 is mounted on an axis inside the elongated hollow drum member 32 which is shown in FIG. 3. The liquid spray nozzle 40 is adapted for spraying a clean liquid flow toward the liquid reflector 48 (shown in FIG. 2C) through the first filter element 34 such that any debris collected by the first filter element is removed and collected by a debris collector 50 (shown in FIG. 3).

A perspective view of a filter housing 52 is shown in FIG. 2C. Filter housing 52 has an elongated shape with a front panel 54, a back panel 56, a bottom panel 58 that are sealingly joined together by a first side panel 60 and a second side panel 62. A liquid inlet 64 is provided through a slot opening at a lower portion of the front panel 54. A filtered liquid outlet 66 is provided through the first side panel 60. The filter housing 52 further includes a liquid reflector 48 which extends upwardly from a top edge of the back panel 56 and curved inwardly toward the filter housing and is adapted for reflecting a liquid spray (not shown) and for collecting debris in a debris collector 50 while returning a liquid through a second filter element 68 into the filter housing 52. It should be noted that the filtered liquid outlet 66 is provided in a circular shape which has substantially the same diameter as the open end 38 of the elongated hollow drum member 32 such that when the drum member is installed in the filter housing through an axis (not shown), the open end 38 of the drum member 32 mates snugly with the filtered liquid outlet 66.

Figure 4:
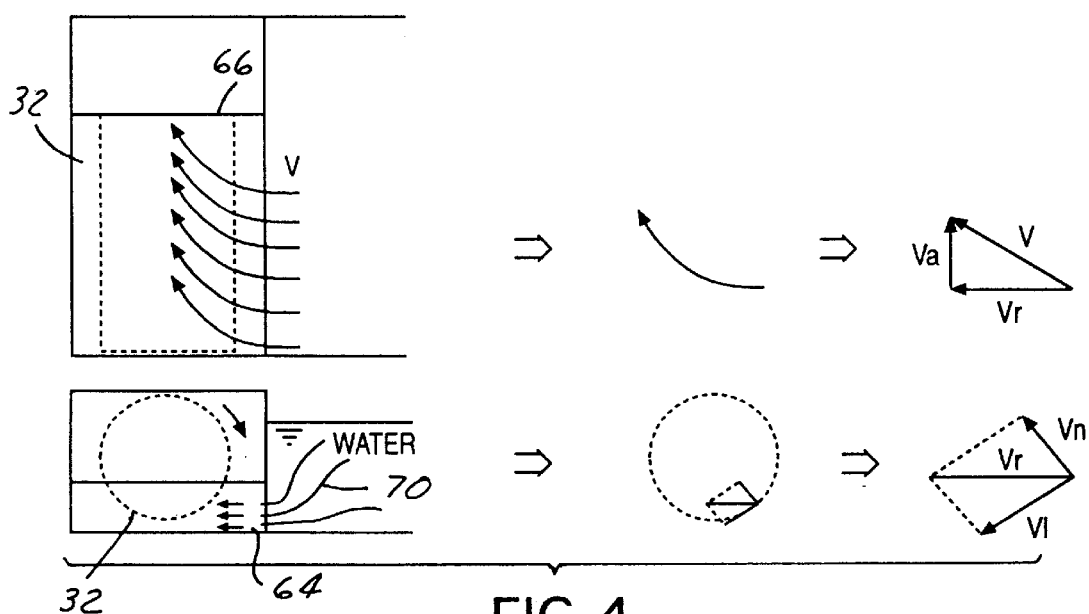
FIG. 4 is an end view and a top view of the present invention self-cleaning liquid filter and the component forces that rotates the elongated drum member.

A completed assembly of the elongated hollow drum member 32 and the liquid spray nozzle 40 located inside the filter housing 52 is shown in FIG. 3. The operation of the present invention novel self-cleaning liquid filter can be explained by examining FIGS. 3 and 4. A liquid flow, such as a waste water flow 70 enters the liquid inlet 64 in the filter housing 52. The hollow drum member 32 is pushed by the liquid flow 70 and thus rotates in a clockwise direction as shown in FIGS. 3 and 4. A large portion of the liquid flow 70 enters the hollow drum 32 through the first filter element 34 and thus dirt and debris in the water flow 70 are trapped by the filter element 34 on the surface of the drum member 32 while clean water enters into the hollow drum and exits through the filtered liquid outlet 66. Simultaneously, clean water 74 enters the liquid flow tube 42 under a sufficient pressure such as 0.5 kg/cm$^2$, or preferably kg/cm$^2$ and is sprayed out in a water spray 76 through the spray holes 46 in the liquid flow tube 44. The water spray 46 washes off the debris and dirt carried on the first filter element 34 and is reflected by the liquid reflector 48 and flows into the debris collector 50. The vertically positioned second filter element 68 stops the debris and dirt and drains clean water back into the filter housing 52.

As shown in FIG. 4, the velocity of the liquid flow 70 can be separated into two components. One component $V_t$ acts on the tangent of the hollow drum member 32 to cause it to rotate in a clockwise direction. The filtered, clean liquid (or water) exits the filtered liquid outlet 66 and can be used either as the clean water supply 74 for the spray nozzle 40, or can be reused in the scrubber for washing intake air that contains debris.

The present invention novel self-cleaning liquid filter and a method to filter a liquid have therefore been amply demonstrated in the above descriptions and in the appended drawings of FIGS. 1–4. While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A self-cleaning liquid filter comprising:

a filter housing of elongated shape having a front panel, a back panel and a bottom panel sealingly joined together by a first and a second side panel; a liquid inlet through a slot opening at a lower portion of said front panel and a filtered liquid outlet through a first side panel; an axis connecting said first and second side panels, a liquid reflector extending upwardly from a top edge of said back panel and curved inwardly toward said filter housing adapted for reflecting a liquid spray and for collecting debris in a debris collector while returning said liquid through a second filter member into said filter housing, an elongated hollow drum member being mounted and is free to rotate on said axis, said drum member being covered with a first filter element on its circumferential surface, sealed at a second end and open at a first end in fluid communication with said filtered liquid outlet in said first side panel of said filter housing, said elongated drum member being mounted in close proximity to said bottom panel such that when a liquid flow enters said liquid inlet through said slot opening in said filter housing, it enters said elongated drum member and rotates said drum member in a direction away from said slot opening with any debris in said liquid flow being collected by said first filter element, and a liquid spray nozzle mounted on said axis inside said elongated hollow drum member adapted for spraying a clean liquid flow toward said liquid reflector through said first filter element for removing any debris collected by said first filter element.

2. A self-cleaning liquid filter according to claim 1, wherein said liquid filter is self-powered.

3. A self-cleaning liquid filter according to claim 1, wherein said liquid flow is water.

4. A self-cleaning liquid filter according to claim 1, wherein said liquid flow is water containing debris and dirt.

5. A self-cleaning liquid filter according to claim 1, wherein said liquid spray nozzle comprises a liquid flow tube equipped with a plurality of spray holes.

6. A self-cleaning liquid filter according to claim 1, wherein said first filter member covering said circumferential surface of said drum member being formed in a metal mesh.

7. A self-cleaning liquid filter according to claim 1, wherein said first filter member covering said circumferential surface of said drum member being formed of a material selected from the group consisting of metal, plastic and paper.

8. A self-cleaning liquid filter according to claim 1, wherein said second filter member being positioned vertically.

9. A self-cleaning liquid filter according to claim 1, wherein said clean liquid flow from said spray nozzle having a liquid pressure of at least 0.5 kg/cm$^2$.

10. A self-cleaning liquid filter according to claim 1, wherein said self-cleaning liquid filter is a water filter for an air conditioner intake air cleaning system.

\* \* \* \* \*